(12) United States Patent
Boys

(10) Patent No.: US 10,755,561 B2
(45) Date of Patent: *Aug. 25, 2020

(54) VEHICLE OR MOVING OBJECT DETECTION

(71) Applicant: Auckland UniServices Limited, Auckland (NZ)

(72) Inventor: John Talbot Boys, Takapuna (NZ)

(73) Assignee: Auckland UniServices Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,323

(22) Filed: Aug. 14, 2017

(65) Prior Publication Data
US 2018/0190112 A1    Jul. 5, 2018

Related U.S. Application Data

(63) Continuation of application No. 14/441,682, filed as application No. PCT/NZ2013/000202 on Nov. 12, 2013, now Pat. No. 9,747,792.

(30) Foreign Application Priority Data

Nov. 12, 2012 (NZ) ..................... 603566

(51) Int. Cl.
*G08G 1/056* (2006.01)
*H02J 50/40* (2016.01)
(Continued)

(52) U.S. Cl.
CPC .............. *G08G 1/056* (2013.01); *B60L 53/12* (2019.02); *B60L 53/30* (2019.02); *B60L 53/38* (2019.02);
(Continued)

(58) Field of Classification Search
CPC .......... G08G 1/056; H02J 50/40; H02J 7/025; H02J 17/00; H02J 50/10; H02J 50/60;
(Continued)

(56) References Cited

U.S. PATENT DOCUMENTS 5,207,304 A    5/1993  Lechner et al.
5,821,728 A *  10/1998 Schwind ............... B60L 11/182
                                                          320/108
(Continued)

FOREIGN PATENT DOCUMENTS

CH          702340 A2    6/2011
EP          1993298      11/2008
(Continued)

OTHER PUBLICATIONS

"U.S. Appl. No. 14/441,682, Advisory Action dated Dec. 30, 2016", 2 pgs.
(Continued)

*Primary Examiner* — Hirdepal Singh
(74) *Attorney, Agent, or Firm* — Schwegman Lundberg & Woessner, P.A.

(57) ABSTRACT

The present application relates to the detection of moving vehicles and other objects, in particular though not exclusively for the application of switching stationary charging pads for moving electric vehicle charging. There is provided an electric vehicle detecting apparatus for switching a charging pad for charging a vehicle transmitting a locating signal, the apparatus comprising two sensors separated in the direction of travel of the vehicle, and a detector arranged to detect the vehicle by comparing the locating signals received by each of the two sensors.

20 Claims, 12 Drawing Sheets

(51) Int. Cl.

| | | |
|---|---|---|
| *H02J 50/90* | (2016.01) | |
| *H02J 50/60* | (2016.01) | |
| *H02J 50/10* | (2016.01) | |
| *H04B 5/00* | (2006.01) | |
| *H01F 38/14* | (2006.01) | |
| *B60L 53/38* | (2019.01) | |
| *B60L 53/39* | (2019.01) | |
| *B60L 53/12* | (2019.01) | |
| *B60L 53/30* | (2019.01) | |

(52) U.S. Cl.
CPC .............. *B60L 53/39* (2019.02); *H01F 38/14* (2013.01); *H02J 50/10* (2016.02); *H02J 50/40* (2016.02); *H02J 50/60* (2016.02); *H02J 50/90* (2016.02); *H04B 5/0037* (2013.01); *H04B 5/0043* (2013.01); *B60L 2270/147* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .......................... B60L 11/182; B60L 11/1824; B60L 11/1829; B60L 11/1831; B60L 2270/147; H01F 38/14; H04B 5/0037; H04B 5/0043
USPC ........................................................ 340/935
See application file for complete search history.

(56) References Cited

U.S. PATENT DOCUMENTS

| | | | |
|---|---|---|---|
| 6,208,268 B1* | 3/2001 | Scarzello ............... G08G 1/042 | |
| | | | 324/174 |
| 9,511,727 B2* | 12/2016 | Takata ................... H04B 3/548 | |
| 9,747,792 B2 | 8/2017 | Boys et al. | |
| 9,821,674 B2* | 11/2017 | Bildstein ................. B60L 53/39 | |
| 2009/0005936 A1 | 1/2009 | Browne et al. | |
| 2009/0045773 A1 | 2/2009 | Pandya et al. | |
| 2009/0316912 A1 | 12/2009 | De Poortere | |
| 2011/0037460 A1 | 2/2011 | Bosnar | |
| 2011/0198176 A1 | 8/2011 | Meins et al. | |
| 2012/0280653 A1 | 11/2012 | Prosser et al. | |
| 2012/0303305 A1 | 11/2012 | Bergqvist et al. | |
| 2013/0033224 A1* | 2/2013 | Raedy ..................... H02J 50/10 | |
| | | | 320/107 |
| 2013/0057204 A1 | 3/2013 | Vollenwyder et al. | |
| 2013/0162136 A1 | 6/2013 | Baldwin et al. | |
| 2014/0132208 A1 | 5/2014 | Fisher | |
| 2014/0132210 A1 | 5/2014 | Partovi | |
| 2014/0318912 A1 | 10/2014 | Woronowicz et al. | |
| 2015/0246614 A1* | 9/2015 | Dames ................... B60L 5/005 | |
| | | | 191/10 |
| 2015/0302745 A1 | 10/2015 | Boys | |
| 2015/0364944 A1 | 12/2015 | Garcia Briz et al. | |
| 2016/0023557 A1 | 1/2016 | Dimke et al. | |
| 2017/0328740 A1* | 11/2017 | Widmer ............... G01D 5/2006 | |

FOREIGN PATENT DOCUMENTS

| | | | | |
|---|---|---|---|---|
| WO | WO 2011016736 A2 * | 2/2011 | ............ H01F 38/14 | |
| WO | WO-2011016736 A2 | 2/2011 | | |
| WO | WO-2011046400 A2 | 4/2011 | | |
| WO | WO-2012132144 A1 | 10/2012 | | |
| WO | WO-2014073990 | 5/2014 | | |

OTHER PUBLICATIONS

"U.S. Appl. No. 14/441,682, Final Office Action dated Sep. 19, 2016", 17 pgs.
"U.S. Appl. No. 14/441,682, Non Final Office Action dated Apr. 6, 2016", 12 pgs.
"U.S. Appl. No. 14/441,682, Notice of Allowance dated Apr. 21, 2017", 10 pgs.
"U.S. Appl. No. 14/441,682, Preliminary Amendment filed May 8, 2015", 6 pgs.
"U.S. Appl. No. 14/441,682, Response filed Feb. 21, 2017 to Advisory Action dated Dec. 30, 2016", 7 pgs.
"U.S. Appl. No. 14/441,682, Response filed Jul. 29, 2016 to Non Final Office Action dated Apr. 6, 2016", 10 pgs.
"U.S. Appl. No. 14/441,682, Response filed Dec. 19, 2016 to Final Office Action dated Sep. 19, 2016", 10 pgs.
"Chinese Application No. 201380058928.9, First Office Action dated Feb. 28, 2017", (Feb. 28, 2017), 16 pgs.
"European Application Serial No. 13854136.2, extended European Search Report dated Aug. 16, 2016", 8 pgs.
"International Application No. PCT/NZ2013/000202, International Search Report and Written Opinion dated Feb. 18, 2014", (Feb. 18, 2014), 9 pgs.

* cited by examiner

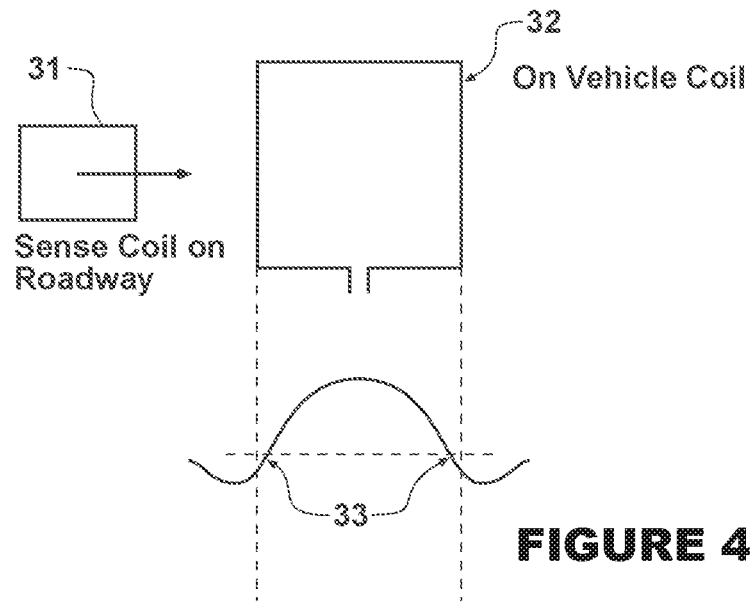
FIGURE 4A
FIGURE 4B
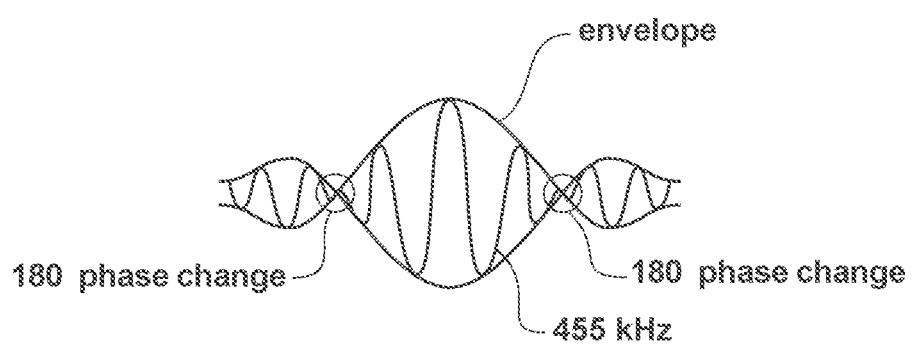
FIGURE 4C

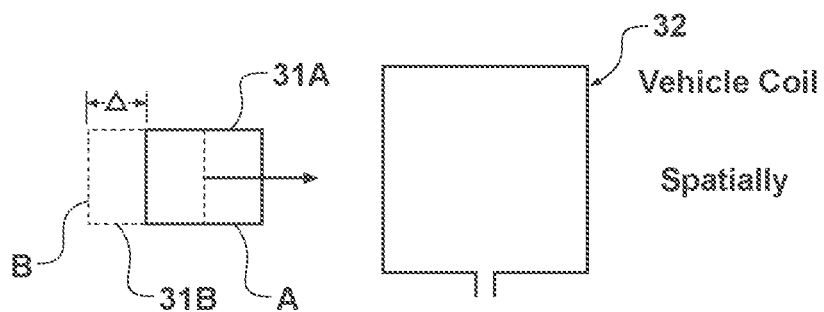
FIGURE 5A
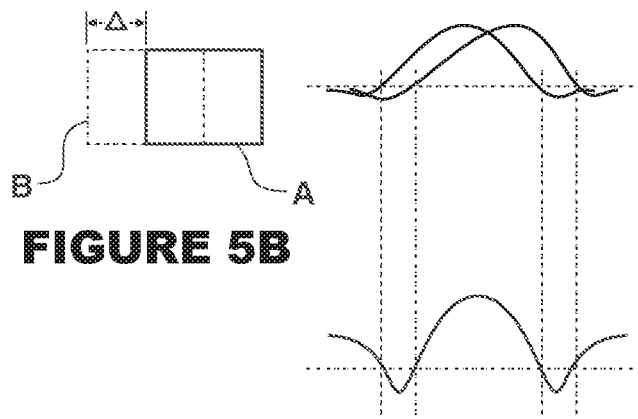
FIGURE 5B
FIGURE 5C
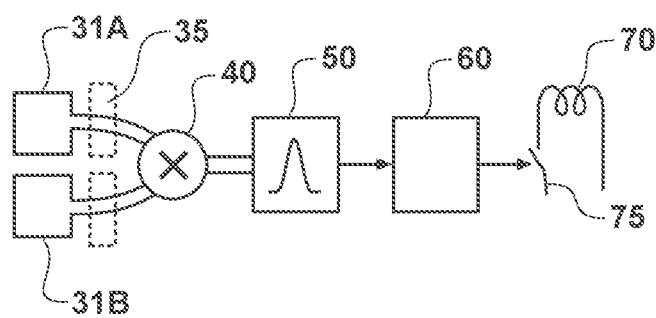
FIGURE 5E

VEHICLE OR MOVING OBJECT DETECTION

This application is a continuation and claims the benefit of priority to U.S. application Ser. No. 14/441,682, filed 8 May 2015, which is a U.S. national stage application filed under 35 U.S.C. § 371 from International Application Serial No. PCT/NZ2013/000202, which was filed 12 Nov. 2013, and published as WO 2014/073990 on 15 May 2014, and which claims priority to New Zealand Application No. 603566, filed 12 Nov. 2012, which applications and publication are incorporated by reference as if reproduced herein and made a part hereof in their entirety, and the benefit of priority of each of which is claimed.

TECHNICAL FIELD

The present application relates to the detection of moving vehicles and other objects, in particular though not exclusively for the application of switching stationary charging pads for moving electric vehicle charging.

BACKGROUND

Systems providing power inductively to moving vehicles along roadways have been discussed and developed for many years. Solutions such as that disclosed in patent publication PCT/NZ 2010/000159 propose a roadway including a plurality of embedded inductive loops; these loops may be energised when a vehicle requiring charge is determined to be in the proximity. One of the challenges in such a system is determining when a vehicle is in proximity with the embedded inductive loops with sufficient accuracy, sensitivity and robustness. Such a detection system must also be able to tolerate the typical misalignments expected in an inductive system involving electric vehicles. Vehicle sensing devices have been developed for other uses involving roadways and systems have been proposed for electric vehicle charging systems. However previously demonstrated systems lack the required accuracy and efficiency for an effective roadway powered electric vehicle system.

A proposed vehicle detection involving a magnetic field created by the road and using the metal bulk of the car as a means for detection, as described in EP01993298 A2, allows for rough detection of moving vehicles. These systems require magnetic fields to be present over the road at all times and are not sensitive to the type of vehicle or inductive charging pads on that vehicle. The system is also open to outside interference and does not generate an accurate position of where the car is. This is particularly problematic with respect to electric vehicles because it is desirable to have the charging pads switched on only when the electric vehicles pads are directly above the charging pads for improved efficiency and safety. An alternative embodiment, as described in US20110198176 uses the induction of voltages in a track, from stray magnetic fields in a train, to detect the train. This system does not provide the indication of a suitable vehicle nor the required precision for most electric vehicle roadway charging systems.

More complex systems for vehicle detection have also have been considered, including systems involving RFID, GPS or infrared detection for example PCT/NZ/2010/000159 proposes using an RFID tag in the electric vehicle as a way to detect the presence of the electric vehicle and control the system. Such systems are complex, they require more control and sensing devices must be positioned in or near the roadway. Furthermore, such systems are typically too slow for moving traffic and do not provide the required detection accuracy. These systems also require the car to tell the road when it is present and to control the switching of the pads. This adds further time and complication to the system and reduces the ability of the road controller to operate an efficient system. Further issues arise in such vehicle detection applications due to the large inductive power transfer signals that are occurring at the same or similar time.

SUMMARY

It is an object of the invention to provide an improved detection apparatus, method or system for moving objects, such as vehicles in a roadway powered electric vehicle system. Alternatively, it is an object of this invention to provide the public with a useful alternative to known apparatus, methods or systems.

In one aspect the present invention provides an electric vehicle detecting apparatus for switching a charging pad for charging a vehicle transmitting a locating signal, the apparatus comprising two sensors separated in the direction of travel of the vehicle, and a detector arranged to detect the vehicle by comparing the locating signals received by each of the two sensors.

In an embodiment, the comparison is determining when one locating signal envelope has passed a zero crossing and the other signal envelope has not. Working with the signal envelopes is easier than the signals themselves, allowing for a simpler and more robust detection mechanism. Alternatively detecting a phase difference between the first and second locating signals can be performed. This can be achieved simply by multiplying the first and second signals which results in an easily detectable DC pulse when the phases are difference (ie when one locating signal envelope has passed a zero crossing and the other signal envelope has not).

Other signal comparisons could include beating or heterodyning the signals, demodulating the signals, combining the signals, other logical or mathematical operations performed on the signals.

When a vehicle is detected, the charging pad is energised in order to charge the detected vehicle as it passes the pad. In order to switch the charging pad off, a second detecting apparatus is used which is located downstream of the first detecting apparatus in the direction of travel of the vehicle.

In an embodiment switching the charging pad on may be in response to detecting the first DC pulse of the product of the locating signals, and switching the charging pad off may be in response to detecting the second DC pulse of the product of the locating signals. Furthermore the apparatus may be arranged to detect the time between the peak of the first DC pulse and the peak of the second DC pulse in order to determine the direction of travel of the moving object.

In an embodiment, each sensor is a sense coil having parallel wires; these may be spaced apart in the direction of travel of the vehicle which usefully biases the detection point to enlarge the detection area compared with the coil area.

In an embodiment the sense coils are arranged around the IPT charging pad, including portions of each sense coil in front of the pad. This allows for propagation time through the system.

Embodiments may include filters to filter out the IPT signal from the received locating signal.

In another aspect there is provided an electric vehicle detecting apparatus for switching a charging pad for charging a vehicle transmitting a locating signal, the apparatus comprising two sensors separated in the direction of travel of the vehicle, a detector arranged to multiply the locating signal received by each of the two sensors, and to identify a characteristic of the product of the received locating signals which corresponds to detection of the vehicle.

In an embodiment the characteristic of the product is a negative DC pulse. This corresponds to a phase reversal between the two received signals and/or envelope zero-crossings.

In another aspect the present invention provides an electric vehicle detecting apparatus for switching a charging pad for charging a vehicle transmitting a locating signal, the apparatus comprising two sensors separated in the direction of travel of the vehicle, and a detector arranged to detect the vehicle by comparing the envelope functions of the locating signal received by each of the two sensors.

In another aspect there is provided a vehicle or moving object detecting apparatus, the vehicle or moving object transmitting a locating signal, the apparatus comprising a sensor for receiving the locating signal and a detector arranged to detect the vehicle by determining a changing characteristic of the locating signal. This changing characteristic could be a zero-crossing in the envelope function of the locating signal and/or a phase change in the received locating signal.

In an embodiment the apparatus comprises two sensors separated in the direction of travel of the vehicle or moving object. The detector may compare the envelope functions or the phase of the locating signal received by each of the two sensors.

In another aspect there is provided an apparatus for determining when an EV is in a position to be charged dynamically from an IPT pad buried under the road said apparatus comprising: 1. On the car: magnetic power pad means that can supply charge to the car, and a small low power signal transmitter that radiates a low power signal under the car at a frequency unrelated to the IPT power frequency; 2. On the vehicle: an IPT power pad that can supply power to the car when the car is in a specific location relative to the ground pad has two receiving coils A and B spatially separated in the direction of travel but otherwise identical that simultaneously receive the signal from the said small transmitter characterised in that the received signals are modulated by the said ground pad receiving coils and that the modulation includes at least one zero that switches the phase by 180 degrees as the receiver passes through the zero such that a condition where one pad A has passed through its zero but the second pad B has not is easily detectable and this is a condition wherein the ground pad may be turned on.

In an embodiment the said receiving coils A and B have two zeroes and the condition where coil A has passed through its first zero before coil B is detected as a small area of operation followed by a situation where coil A passes through its second zero before coil B giving a second area of operation and the first said area may be used to turn the pad on and the second area of operation may be used to turn the pad off giving independent control of the on off switching of the ground pad.

In another aspect there is provided an apparatus for detecting an approaching secondary pad of an IPT having a primary pad system and a secondary pad system, the primary pad system having two or more detectors to generate detection signals representative of secondary pad signal associated with the secondary pad system and the operable to combine the detection signals to provide a combined signal which has a characteristic that represents the difference of the envelope of the two detection signals In another aspect there is provided a sense coil, comprising one or more turns of a first conductor adapted to detect a magnetic field produced by a second conductor, the second conductor being associated with a moveable object, whereby the sense coil produces an electrical signal in response to the presence of the second conductor.

In a preferred embodiment the moveable object comprises a vehicle.

In a preferred embodiment the sense coil detects a magnetic field and produces a voltage signal.

In a preferred embodiment bias due to the second conductor allows advance detection of the vehicle.

In a preferred embodiment zero crossings of the voltage signal indicate proximity of a vehicle to the sense coil.

In an alternative embodiment a sense coil may be able to infer information relating to the electric vehicle and provide this in the electrical signal. In some embodiments a characteristic of the electrical signal such as voltage, amplitude or frequency may be used to transmit alternate signals.

In one embodiment a detection means is provided, wherein the detection means produce a control signal based on the electrical signal produced by the sense coil.

In a preferred embodiment one or more sense coils may be associated with a roadway. In one embodiment the one or more sense coils are associated with one or more inductive power transmission modules. In other embodiments one sense coil may be associated with a plurality of inductive power transmission modules. In yet other embodiments, a plurality of sense coils may be associated with a single inductive power transmission module.

In a preferred embodiment a sense coil is positioned in middle central region of an inductive power transmission module and is offset by a distance in the direction of vehicle travel.

In a preferred embodiment the distance of separation is of the order of 5 cm.

In a preferred embodiment the sense coil forms a loop approximately 60% the size of a second conductor in the system.

In one embodiment this disclosure describes a detection means which includes an input to receive a signal from a sense coil, and an output that provides a detection signal representative of the position of a moveable object relative to the sense coil.

In a preferred embodiment the detection signal may comprise a control signal.

In a preferred embodiment and the detection means may include one or more amplifiers, filters, signal combiners such as multipliers, signal processing electronics.

In one embodiment the detection means comprises a control signal generator.

In a preferred embodiment there are two sense coils associated with each control signal generator.

In a preferred embodiment the control signal is formed by the multiplication of the signal from two sense coils.

In a preferred embodiment the control signal may be formed by multiplying together the signals from two or more sense coils with associated electronics such as filters and amplifies.

In some embodiments the zero crossings of the combined signal may be used to indicate the proximity of the moving object.

In a further embodiment the slopes of the combined signal below zero may be used to indicate the direction of the moving object.

In a particular embodiment, using two sense coils, the difference in time between the first zero and the peak of the negative pulse and the same peak and the second zero may be compared to indicate the direction of the moving objection.

In a preferred embodiment the filters are tuned to attenuate any signal at IPT (Inductive Power Transfer) frequencies, such as 20-80 kHz to around −90 dB.

In one embodiment each of the one or more sense coils is associated with one of the inductive power transmission modules.

In an alternative embodiment one or more of the sense coils may be associated with a plurality of inductive power transmission modules.

In a preferred embodiment two sense coils separated by a small spatial distance are associated with each inductive power transmission module.

In a further embodiment the control signal generator may receive a signal from one or more sense coils and cause a change in road conditions or signals. In an alternative embodiment the control signal may be sent to an external user.

In one embodiment the disclosure describes the detection of a vehicle using a sense coil adapted to detect a signal, or characteristic of a signal, from the moving vehicle.

In one embodiment the disclosure describes the detection of a moving vehicle using a sensor associated with a stationary object, a detection means associated with the sensor, and a passive component in the moving vehicle.

In a further embodiment this disclosure describes the detection of a vehicle where the vehicle provides a constant signal. Preferably the constant signal comprises a substantially constant alternating signal.

In one embodiment this disclosure describes a roadway controller for an IPT system comprising one or more sense coils that are associated with a control signal generator which produces a signal for an IPT controller indicating when a vehicle is in proximity to an inductive power transmission module.

In a preferred embodiment the roadway controller allows the IPT system to remain off until an appropriate electric vehicle inductive power transmission module is near to the roadway inductive power transmission module.

In a preferred embodiment the roadway controller for the IPT system involves one or more sense coils for each inductive power transmission module, a control signal generator and an output signal to control the switching of the inductive power transmission modules.

In an alternative embodiment the roadway controller may take an input from one or more sense coils and switch a plurality of inductive power transmission modules based on information in the signal form the sense coils.

In one embodiment this disclosure describes detection apparatus comprising a second conductor energised by an AC power source, control electronics and a loop to generate a magnetic field adapted for detection by a first conductor.

In a preferred embodiment the second conductor is adapted to create a magnetic field with a characteristic that may be detected by a sense coil.

In one embodiment the first conductor comprises a sense coil.

In a preferred embodiment the second conductor creates a magnetic field at a defined frequency that may inductively couple to the sense coil in a roadway. In an alternative embodiment another characteristic of the field may be adapted to match the sense coil.

In a preferred embodiment the frequency of the AC power source is outside the range used for power transfer in a nearby inductive power transfer system.

A preferred embodiment uses the frequency range of 420 to 450 Kilohertz.

In a preferred embodiment the second conductor is substantially the same size as the vehicle inductive power transfer module. In a preferred embodiment the second conductor is located around the circumference of the vehicle inductive power transmission module.

In one embodiment each of the one or more inductive power transmission modules on the vehicle has a second conductor. In an alternative embodiment a single second conductor on the vehicle may be associated with one or more or all of the inductive power transmission modules on the vehicle.

In an alternative embodiment the second conductor may be able to receive communications from the roadway. In this situation it may be possible for communications in both directions between the sense coil and the second conductor.

In a further alternative embodiment the AC source or electronics of the second conductor may be adapted to provide further communication signals through the use of electronic characteristics including frequency and amplitude.

In one embodiment this disclosure describes a vehicle including a second conductor adapted to interface with, or provide an appropriate field or signal to, a sense coil in a roadway.

In a preferred embodiment the vehicle includes a second conductor associated with or near to the inductive power transmission module of the vehicle. In an alternative embodiment the vehicle includes a second conductor without an inductive power transmission module being present.

In one embodiment this disclosure describes a roadway including one or more sense coils adapted to detect a magnetic field generated by a second conductor.

In a preferred embodiment the road is also associated with a roadway powered electric vehicle (RPEV) system including one or more inductive power transmission modules.

In a further embodiment the road is associated with a sense coil, a control signal generator and an IPT system to enable the control of a roadway powered electric vehicle system.

In a preferred embodiment the roadway consists of a plurality of inductive power transmission modules in a chain with the state of each inductive power transmission module associated with the signal from one or more sense coils.

In a preferred embodiment the roadway and sense coils enable each of the roadway inductive power transmission modules to turn on when a vehicle inductive power transmission module is above it and off when the vehicle inductive power transmission modules is no longer above it.

In one embodiment this disclosure describes a method for controlling a roadway powered electric vehicle system comprising;
  Providing one or more sense coils for recognising one or more second conductors, each second conductor being associated with a vehicle,
  Processing signals from a or the sense coils,
    Controlling one or more inductive power transmission modules based on the processed signals.

In one embodiment this disclosure describes a method for controlling a roadway powered electric vehicle system comprising;
  Receiving a signal from one or more sense coils,
  Processing the signal from a or the sense coils, Controlling one or more power transmission modules based on the processed signal.

In one embodiment the step of controlling the one or more power transmission modules includes switching the one or modules on or off.

In a preferred embodiment a set of sense coils will register the proximity and direction of a vehicle coil moving towards a or the inductive power transmission modules and propagate a signal to the control signal generator. In turn the control signal generator will produce a signal for the IPT controller to allow appropriate switching of the associated inductive power transmission modules.

In a further embodiment this disclosure describes a method for determining the direction of movement of a vehicle, comprising;

Using one or more sense coils to recognise one or more second conductors, multiplying together the signals form a or the sense coils, the multiplied signal being examined to determine the vehicle movement.

In a preferred embodiment the multiplied signal is examined after a period when the voltage is below zero and a comparison of the slope between the minimum value and each zero crossing indicates the direction of the vehicle.

In a preferred embodiment the multiplication of two spatially delayed signals allows for detection based upon the DC component of the signal. In a particular embodiment negative DC pulses are used to indicate switching times.

In a preferred embodiment a further characteristic of the signal provides direction information.

In a further embodiment the signals from one or more sense coils in different spatial positions may be combined to allow the control of a plurality of inductive power transmission modules.

In an alternative embodiment the a series of roadway inductive power transmission module may be controlled sequentially, or in a group by one or more sense coils. In a further alternative model one or more vehicle inductive power transmission modules may be indicated by the signal from the second controller.

In a further embodiment the system is able to also infer the size of the vehicle and adjust the power to a charging pad appropriately.

Within this specification embodiments are described in a way which enables a clear and concise specification to be written, but it is intended, and will be appreciated, that embodiments may be variously combined or separated without parting from the invention.

Further aspects of the invention will become apparent from the following description.

DRAWING DESCRIPTION

One or more embodiments of the invention will be described further below with reference to the accompanying drawings, in which:

FIGS. 4A and 4B shows a diagrammatic plan view, and output voltage of a sense coil for a rectangular sense coil and vehicle coil arrangement;

FIG. 4C shows the AC nature of the signal represented in FIG. 4B;

FIG. 5A, 5B, 5C show a plan view of an arrangement using two sense coils, individual envelope outputs, and a multiplied signal output;

FIG. 5E is a schematic of a charging pad switching system using the arrangement of FIGS. 5A-D;

DESCRIPTION OF ONE OR MORE EMBODIMENTS

Figure 1A:
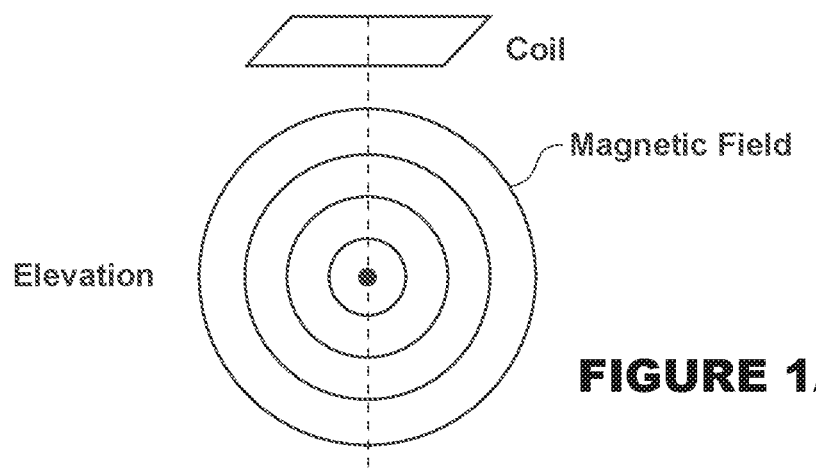
FIG. 1A is a diagrammatic elevation of a wire and a coil.
Figure 1B:
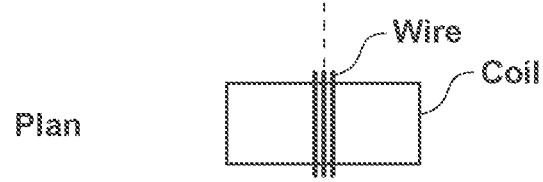
FIG. 1B is a plan view of FIG. 1A.
Figure 1C:
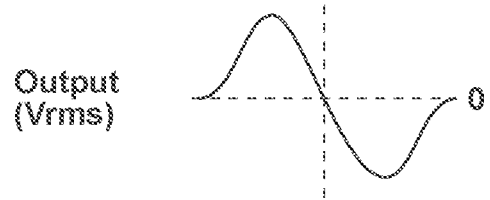
FIG. 1C is a diagram showing output voltage in the coil relative to position of the wire.

Referring to FIGS. 1A-C current in a wire may be sensed by a coil sensitive to vertical flux only. The coil will give a zero output (see FIG. 1C) when it is symmetrically over the wire. Here a 2D model is used with the return wire at infinity. The arrangement is shown in FIGS. 1A and 1B. The voltage in the coil is zero when it is symmetrically over the wire. The coil may be any shape but circular is common. However a preferred shape is rectangular as it gives a sharper transition in detecting a straight wire with a current in it. There is no bias in this measurement—the zero position is accurately over the wire for all vertical displacements provided the return wire is at infinity.

This situation is well known and accepted. Less well known is that the presence of a return wire causes a bias in the measurements and here that bias is used preferentially to allow a sensing area larger than the area of the pad so that the control of power from the roadway to the vehicle can be almost completely seamless and smooth and continuous. In practice the energy transferred to the vehicle goes to the wheels without being stored in the vehicle's battery but excess energy and regenerative power is scavenged by the system to keep the battery fully charged. To do this requires knowledge of the roadway pads' locations relative to the vehicle and this is the information needed for a viable system.

Practical Considerations

Figure 2:
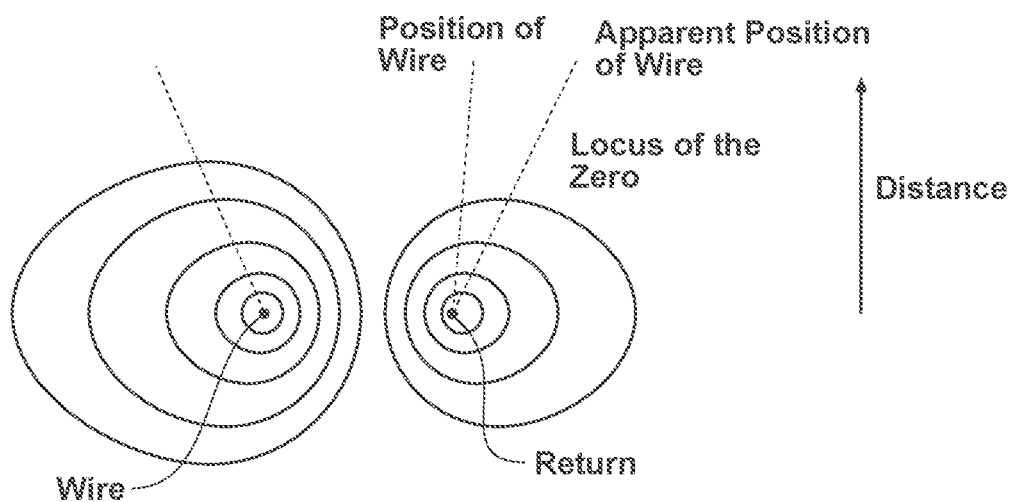
FIG. 2 is an elevation of the wire of FIG. 1 and the return.

In practice a single wire cannot be used as there must be a path for a return current to flow. A return wire could be placed under the existing wire to keep the system without bias but usually it will be placed to the side of the wire causing a bias in the location of the zero. The arrangement is shown in FIG. 2. The zero output condition now depends on the height of the coil above the wire and the spacing between the wire and its return, as a function of the coil size. In this document the bias will be ignored in the first instance. The position of both the original wire and the return wire can be sensed: the average position is half-way between the two wires without any bias. The two wires are preferably on different edges of the on-car pad and both may be sensed by coil on the ground pad—with a bias that in fact turns out to be beneficial.

Figure 3A:
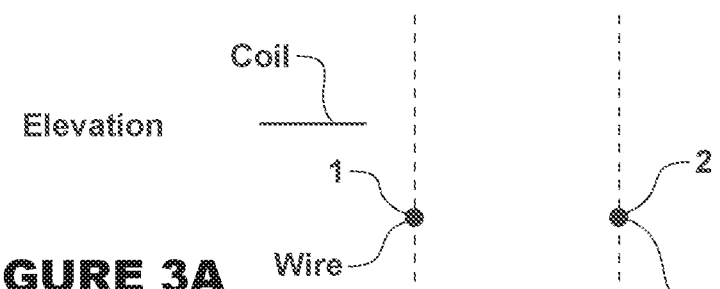
FIG. 3A, 3B, 3C are elevation, plan and output voltage of the arrangement of FIG. 2.
Figure 3B:
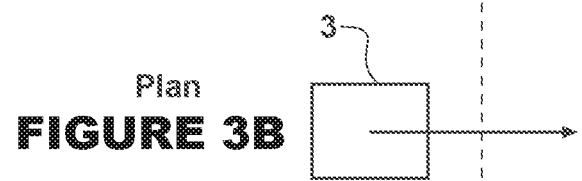
Figure 3C:
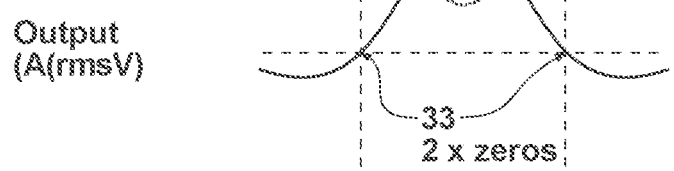

A practical circuit is shown in FIGS. 3A and 3B. Here two wires 1, 2 are shown corresponding to the wire with a current in it and its return. The magnetic fields from the wires are sensed with a rectangular coil 3 and the output voltage is plotted (see FIG. 3C). If the wires are too far apart the maximum output may sag—see dotted line 4. For a square coil the output between the wires is much larger than the output outside the wires by a factor of typically five times. The sensing method only works with AC excitation and the output voltage polarity cannot be simply observed or determined.

A Car and Roadway System

In this application the wires (send and return) are on the vehicle and it is best to separate them by a significant amount. The maximum possible (sensible) separation is defined by the edges of the on-vehicle pad. It is helpful to use two separate rectangular coils to allow more sophisticated detection and the straight edges of the wires and the coils are helpful to improve the response. The arrangement is shown in FIG. 4A. Here only one sense coil 31 is used and its output as it moves across the vehicle coil 32 is plotted in FIG. 4B as voltage against the spatial displacement (in use the sense coil would typically be stationary as the vehicle passed over it). The system is assumed to have no bias and the voltage zeroes 33 may be used to detect when to turn the ground pad on and off. We note here that the signal shown in FIG. 4B is an envelope of the AC signal that would be detected by the sense coils. In a real situation the AC nature of the signal introduces a rapid oscillation within the envelope and makes the signal difficult to work with, this is demonstrated by FIG. 4C. FIG. 4C also demonstrates a 180 degree phase change at the voltage zeros 33.

In practice sensing AC zeroes in the presence of noise is difficult and an improved method is shown in FIG. 5A using two sense coils 31A and 31B that are identical in size and shape, and the output of coil B is identical to that of coil A but is delayed (moved) spatially by a small amount delta, in a preferred embodiment this distance may be approximately 5 cm.

Figure 5D:
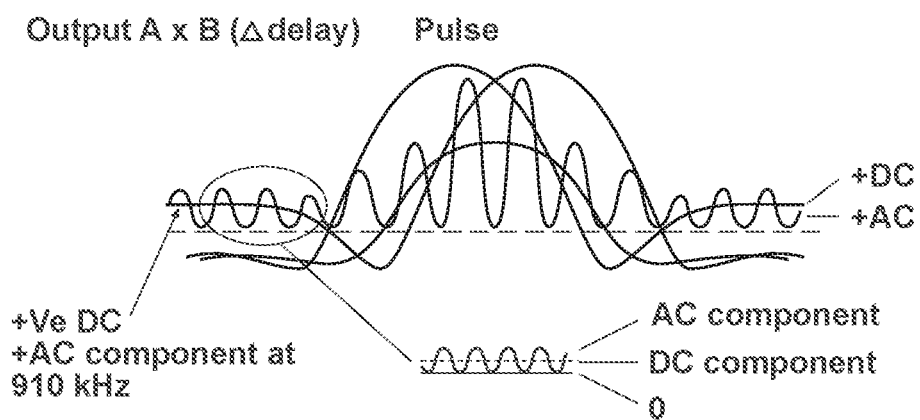
FIG. 5D shows the AC nature of the outputs of the multiplied signals for the sense coils for the FIG. 5A-C arrangement together with the negative DC pulse.

In the time domain this delay shows up as a delay in time between the two signals—shown in FIG. 5B. The A and B signals are in phase to the left of the diagram with both signals shifted by 180 degrees—this cannot be measured. They are also in phase in the centre of the diagram with both signals nominally at zero phase, and they are in-phase again to the far right of the diagram with both signals 180 degrees out of phase. But in the transitions the signals are out of phase (i.e. 0 and 180 degrees or 180 and 0 degrees respectively) and these transitions may be detected by multiplying the two signals, A and B, together to get a DC output as shown in FIG. 5C. The multiplication of the two signals has the effect of reducing any importance on the AC frequency for system switching detection. This is because the detection means no longer needs to be zero crossings 33 but has become DC negative pulses 34, as opposed to the positive DC component normally in the system. The AC nature of the signals is shown in FIG. 5D. There is also a double frequency component but this can be ignored and by removing with a suitable high frequency filter if required. These negative transitions correspond to the locations of the wire on the on-vehicle pad. The presence of a bias, as was shown in FIG. 2, moves these negative regions wider apart so that the on-vehicle pad may be detected in advance—and indeed the in-ground pad may be switched on in advance. Without a bias this is not possible so the control of the bias allows control of the pad switch on/off points and this is an important feature of this technique.

FIG. 5E shows a schematic of a suitable circuit for implementing this embodiment, although any suitable alternative circuit may be used as would be appreciated by those skilled in the art. The two sense coils 31A and 31B are coupled to a multiplier 40 via respective filters 35 which filter out the IPT frequencies of the charging pad. The output or product of the multiplier is coupled to a peak detector 50 which detects proximity of the on-vehicle locating coil which is transmitting a locating signal. The two sense coils are spaced apart in the direction of travel of the vehicle carrying an on-vehicle charging pad and the on-vehicle locating coil which is adjacent the charging pad. This locating signal is received by both the sense coils, but separated in time as described above.

A controller 60 uses the peak detection to switch the ground charging coil 70 to an energised state using a switch 75, so that the on-vehicle pad received wireless power from the energised charging coil 70 as it passes overhead. The second peak detected and shown in FIG. 5C may be used to switch the charging coil 70 off, the second peak corresponding to the vehicle moving away. Any suitable controller and/or peak detector or alternative circuit which achieves the same functionality may be used as would be apparent to those skilled in the art.

In effect the embodiment compares the received locating signal from the two spaced apart sense coils. In this case the signals are multiplied which is a simple cost effective solution. However other locating signal comparisons are possible, for example directly comparing when the envelope functions of the two signals have a zero-crossing, or when the two locating signals have different phases.

Whilst sense coils have been used in this embodiment, other types of sensors may be employed, including for example coils vertically oriented where bias is less important.

Practical Issues

An IPT system works at frequencies typically in the range 20-80 kHz so the sensing method cannot use that frequency range. In the work done here we have used a frequency of 420-450 kHz which is quite easy to generate at the low powers involved here. This frequency is chosen to avoid interference at IPT frequencies and to be low enough to allow a range of electrical components to be used. We note that a range of frequencies could be used based on further optimisation. Perhaps more important when the sensing system is working much larger signals are present. The sensing system or detection means may measure a voltage of 200 mV but also present are voltages at the IPT frequency. If the coils are perfectly aligned this voltage can be zero but if they are not aligned then this unwanted voltage can be 50-100 V. Thus it is desirable to have good filters and very stable amplifiers. We have used band-pass filters tuned to 455 kHz with a 100 kHz pass band at −6 dB and an attenuation of −90 dB at 44 kHz, and highly stable transistor amplifiers with a voltage gain of 35 dB at 455 kHz and 0 dB at 44 kHz and these are able to keep all the signals separated from each other and allow the sensing/detection concept to work. The band-pass filters are connected directly to the outputs of coils A and B and the amplifier amplifies the outputs of the filters. The outputs are multiplied using an Analogue Devices multiplier to give signals that are easily processed from that point using either analogue or digital techniques.

In this way as the vehicle pad passes over the ground pad the wires in the vehicle pad may be sensed by circuitry in the ground pad and the ground pad may be turned on by one of the negative pulses shown in FIG. 5C and turned off by the other one. It should be emphasised that these pulses are in the spatial domain and do not change with time but rather with the displacement of one pad with respect to the other one. In this way the pads can be switched at very high speeds capable corresponding to vehicular speeds of 100 kph and higher. The pads can also be switched on/off when the vehicle is travelling in reverse. However the pad switching must be synchronised with the vehicle motion.

A study of FIG. 5C shows that the inside edges of the reverse polarity pulses are steeper than the outside edges. This comes about as the pulses are generated by the multiplication of two pulses of the form shown in FIG. 3 and the inside edges of this pulse are clearly at a higher gradient than the outside edges so when they are multiplied together this difference persists. However the slopes in FIG. 3 cannot be observed as these pulses are the envelope of an AC signal but when they are multiplied together the slope information is available.

Figure 6:
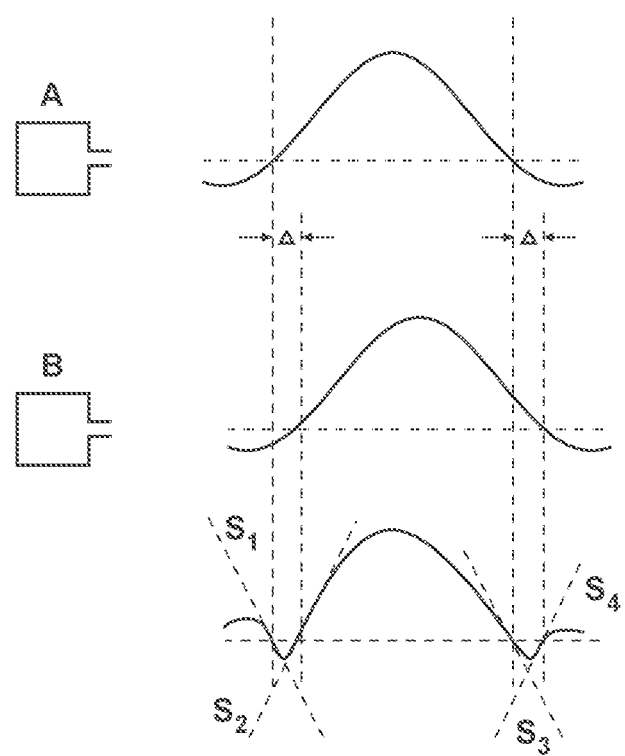
FIG. 6 shows the individual envelope output signals and the multiplied output.

A plot of the waveforms involved is shown in FIG. 6. Here the waveforms A and B are envelopes of AC signals and the graph as shown is conceptual only but the product is an observable graph and it is clear that $S_1$ is a smaller slope than $S_2$ and that $S_3$ is smaller than $S_4$—the outside slopes are smaller than the inside slopes (ignoring the signs). So by simply measuring and comparing the slopes on the sides of any negative pulse it is easy to determine what type of pulse it corresponds to. A pulse with a larger slope followed by a smaller slope is a turn the pad off pulse whereas a pulse with a smaller slope followed by a larger slope is a turn the pad on pulse. This condition is independent of the direction of travel and is always true. The pulse slopes may be difficult to measure but a relatively simple method is to measure the time from zero to the peak of the negative pulse and compare that with the time back to zero.

Using this method a car travelling over a string of pads will turn the pads on as it comes to them and turn them off as it leaves them. The pads may be widely separated or in close proximity and multiple pads may be used on the vehicle to get more power from the string.

Figure 7:
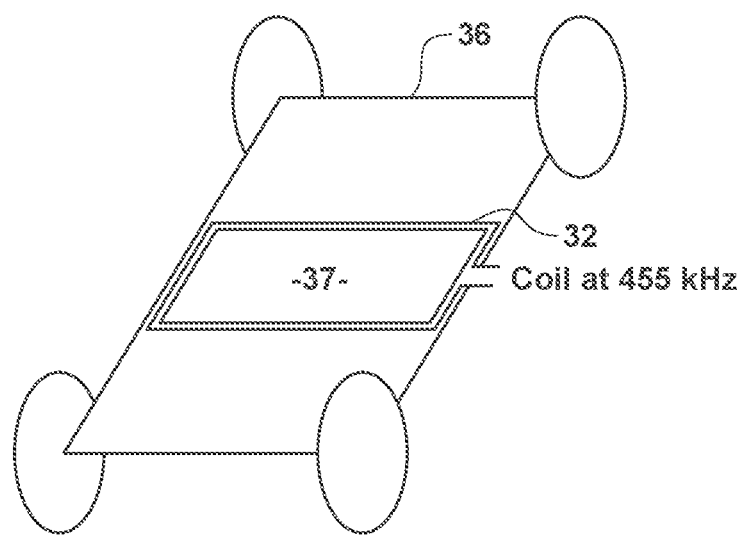
FIG. 7 shows a diagrammatic vehicle with a vehicle coil.
Figure 8:
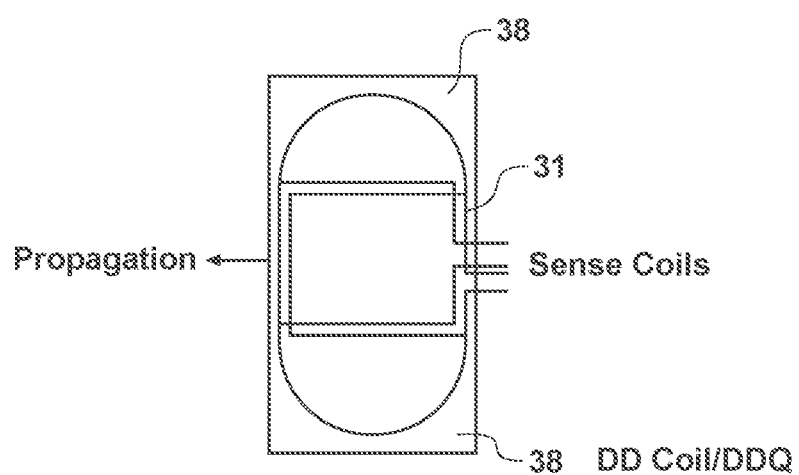
FIG. 8 shows a plan view of a sense coil in proximity to a road charging pad.
Figure 9:
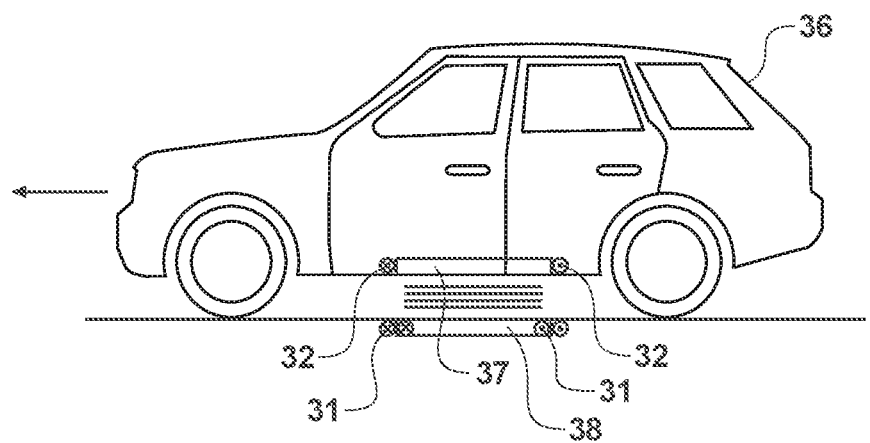
FIG. 9 shows a vehicle in the form of a car moving over a road charging pad.

FIG. 7 demonstrates the position of the vehicle coil 32 on an electric vehicle 36 with a charging pad 3. The charging pad is placed on or near to the bottom of the vehicle and the vehicle coil may be typically placed around the circumference of the inductive power transfer pad. A means for generating the AC signal in the vehicle coil 32 may be stored in the electric vehicle 36. A control system for the coil, including switching means may also be included. FIGS. 8 and 9 show the relative locations of the vehicle charging pad and roadway charging pad when there is inductive power transfer between them. The sense coils 31 may be located in the same position as the roadway charging pad 38 or nearby. A typical arrangement involves two sense coils, approximately 60% of the size of the vehicle coil 37 and placed inside the circumference of an associated roadway charging pad, as in FIG. 8. The detection means described in this disclosure allows for the roadway charging pad to be appropriately controlled, either directly from the output of the detection means or using an appropriate control means. In one example the roadway pad is switched on when the leading edge of the vehicle coil 32 approaches the sense coils 31 and switched off when the trailing edge of the vehicle coil has moved past the sense coils. Thus the roadway charging pad switched on time is limited to the time the vehicle charging pad is placed above it and is able to efficiently and safely transfer power.

Alternatively the sense coils may be located around the circumference of the charging pad, with a wire of each in advance of the charging pad in order to allow for propagation time of the signalling to switch the charging pad. Typically the sense coils will include two parallel wires arranged perpendicular to the direction of travel of the vehicle in order to maximise the received locating signal.

Figure 10:
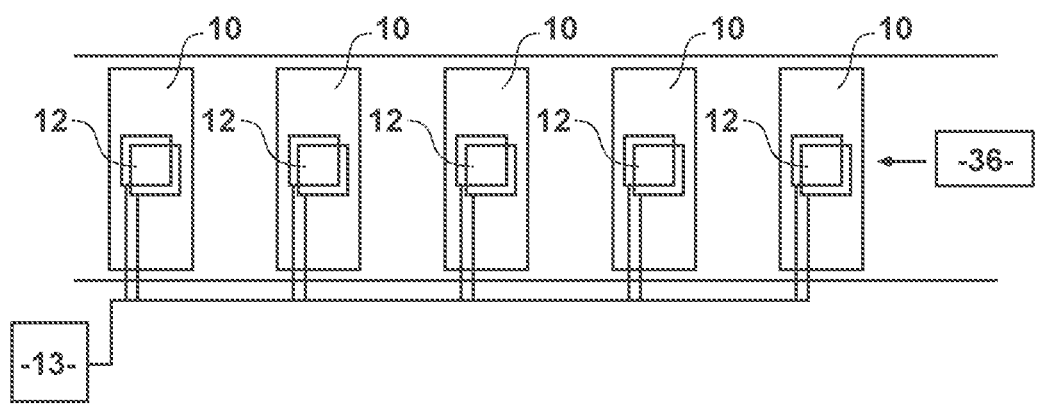
FIG. 10 shows a plan view of a roadway including multiple charging pads and sense coils associated therewith.

A plurality of inductive charging pads 10 may be placed in roadway 11, as shown in FIG. 10. These may be placed directly in line, one after another, or there may be some form of gap between them, this gap may be half a pad width. The detection of a vehicle may take place individually, with each pad having one or more associated sense coil/s 12 and operating independently to detect each vehicle. A control means 13 may be provided for each sense coil or for a group of sense coils. As a vehicle traveled along the road each inductive charging pad would turn on as the vehicle coil was detected and off once the vehicle coil had passed, thus allowing a continuous, or near continuous transfer of energy into the vehicle. If a vehicle was not moving it would continue to receive power from the road charging pad, however if the vehicle coil was turned off then neither charging nor detection fields would be present on the road. In one embodiment this vehicle coil could be controlled by the car electronics, the car user or be linked to operation of the car.

In an alternative system the sense coils may be associated with a plurality of inductive power transmission modules. In this situation a vehicle travelling over the system may initiate a series of pads to switch on and off. In an alternative situation in which a vehicle, or multiple vehicles travelling together, have a series of inductive power transmission modules the sense coil may be able to respond to this by staying on until a final inductive power transmission module is reached, or for a certain time period. This may mean that one in ten inductive power transmission modules have sense coils, or a vehicle has a single vehicle coil for a plurality of inductive power transmission modules. In addition to these features the signal generated by the car may be used to provide further information to the road, this may be through the use of some characteristic of the signal and may indicate information such as the type of vehicle or the size of inductive power transmission modules or charge level.

The system for detection may have uses that apply to vehicles that may not be using electric power; in this sense the detected vehicle may desire special treatment from some part of the road. This may include the system being used to detect a type of vehicle approaching and switch traffic signals or make a section of the roadway accessible. In an alternative embodiment it may be used to determine the position of a passing vehicle, for instance a bus, and report this to a control means. Alternatively it may be used to determine the position of a vehicle in relation to a weigh station or other road feature. In one embodiment the system may provide a method for allowing preferential passage to vehicles with appropriate signals.

Figure 11:
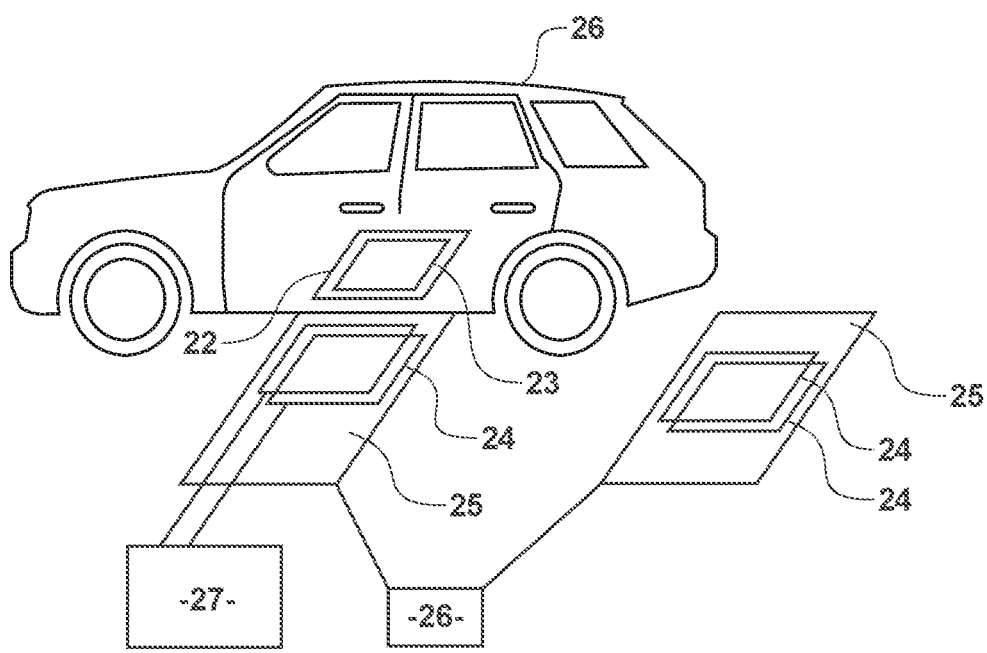
FIG. 11 shows a schematic of a vehicle detection system according to one embodiment of the invention.

FIG. 11 shows a schematic in which a vehicle has an AC energised conductor such as a coil 22 associated with an inductive charging pad 23. Sense coils 24 are provided in or on a roadway in a known location relative to roadway charging pads 25 which may be selectively energised by power supply 26. Detection and/or control means 27 supply an appropriate detection and/or control signal to power supply 26 for appropriate switching/energisation/de-energisation of the pads 25.

Although this disclosure has concentrated on the use of a detection scheme in an electric vehicle charging system we acknowledge that a wider scope of uses exists. In particular this system is applicable for detecting the position of any moving object on a surface with one or more sense coil present. This may include uses in conveyer belt systems, manufacturing environments or electronic device charging. Alternatively vehicles such as automated guided vehicles (AGVs) may use this system, including cranes and waterside ship loaders. It may be used in situations where a vehicle or other integers are not moving. This may include a situation in which an electric vehicle is parked and wishing to be charged.

What is claimed is:

1. An apparatus for switching a charging pad for charging a vehicle, the apparatus comprising:
an inductive sense coil configured to sense a magnetic field from the vehicle;
a filter to remove inductive power transfer signals from locating signals induced in the inductive sense coil by the magnetic field; and
a circuit configured to detect the vehicle from the filtered locating signals.

2. The apparatus according to claim 1 wherein the magnetic field of the vehicle is a time varying magnetic field.

3. The apparatus according to claim 1, wherein the sense coil has parallel wires arranged substantially perpendicular to a direction of travel of the vehicle, and the parallel wires are spaced apart in the direction of travel of the vehicle.

4. The apparatus as claimed in claim 1 further including an additional sense coil for detecting a magnetic field from the vehicle, and wherein circuit is configured to combine locating signals received from the sense coil with locating signals received from the additional sense coil, and to use the combined signal to detect the vehicle.

5. The apparatus as claimed in claim 1 wherein the apparatus comprises a charging pad, and the circuit is configured to energise the charging pad when the vehicle is over the charging pad.

6. The apparatus as claimed in claim 1 wherein the apparatus comprises a charging pad, and the circuit is configured to de-energise the charging pad when the vehicle is moving away from the charging pad.

7. The apparatus as claimed in claim 1 wherein the circuit is configured to process the filtered locating signals to provide a peak, and to use peak detection to detect the vehicle.

8. The apparatus according to claim 1 wherein the circuit is configured to combine two or more filtered locating signals to form a composite signal, and use the composite signal to detect the vehicle.

9. The apparatus according to claim 1 wherein the circuit is configured to multiple two or more filtered locating signals to form a product of the two or more filtered signals, and use the product of the two or more filtered signals to detect the vehicle.

10. The apparatus according to claim 9 wherein the apparatus comprises an inductive power transfer (IPT) charging pad, and the apparatus is configured to energise the charging pad in response to detecting the vehicle.

11. The apparatus according to claim 8, wherein the apparatus is arranged to switch on the charging pad in response to detecting a first DC pulse of the product of the two or more filtered locating signals, and to switch off the charging pad in response to detecting a second DC pulse of the product of the two or more filtered locating signals.

12. The system according to claim 11 wherein the apparatus is further arranged to detect the time between the peak of the first DC pulse and the peak of the second DC pulse in order to determine the direction of travel of the vehicle.

13. A method of detecting an electric vehicle for switching a charging pad for wirelessly charging a vehicle, the method comprising:
detecting from an inductive sense coil a magnetic field of the vehicle;
filtering locating signals induced in the inductive sense coil by the magnetic field to remove inductive power transfer signals from the locating signals;
detecting the vehicle from the filtered locating signals.

14. The method according to claim 13, further comprising determining when a zero-crossing has occurred in an envelope of one of the filtered locating signals but not in another of the filtered locating signals.

15. The method according to claim 13, further comprising determining when the phase of one of the filtered locating signals is substantially 180 degrees different to the phase of the other filtered locating signal.

16. The method according to claim 13, further comprising multiplying the filtered locating signals in order to detect a DC peak corresponding to detection of the vehicle.

17. The method according to claim 16, further comprising detecting a second DC peak in the product of the filtered locating signals corresponding to the vehicle passing the charging pad.

18. A method of controlling a wireless charging pad comprising
filtering signals induced in a sense coil of the wireless charging pad to remove signal components in a first frequency range,
the first frequency range corresponding to a charging frequency of the wireless charging pad,
detecting a locating signal from a vehicle, induced in the sense coil,
wherein the locating signal is induced by a time varying magnetic field having a frequency that is outside the first frequency range, and
energising the wireless charging pad responsive to detecting the locating signal.

19. The method of claim 18, wherein the method comprises combining two or more filtered locating signals to form a composite signal, and using the composite signal to determine the proximity of the vehicle to the wireless charging pad.

20. The method of claim 18, wherein the method comprises de-energising the wireless charging pad responsive to detecting a change in the locating signal.

* * * * *